US005745151A

United States Patent [19]

Fujishiro

[11] Patent Number: 5,745,151
[45] Date of Patent: Apr. 28, 1998

[54] COLOR THERMAL PRINTER COLOR THERMAL PRINTER HAVING MOVABLE FIXING LAMPS

[75] Inventor: Takeshi Fujishiro, Saitama, Japan

[73] Assignee: Fuji Photo Film Co., Ltd., Kanagawa, Japan

[21] Appl. No.: 517,698

[22] Filed: Aug. 22, 1995

[30] Foreign Application Priority Data

Aug. 26, 1994 [JP] Japan .................................... 6-202020

[51] Int. Cl.[6] ............................ B41J 2/325; B41J 2/315; G01D 15/10

[52] U.S. Cl. ............................................ 347/212; 347/175

[58] Field of Search .................................... 347/175, 212, 347/102, 152, 232; 399/320, 336; 355/113, 114; 400/120.18

[56] References Cited

U.S. PATENT DOCUMENTS

| | | | |
|---|---|---|---|
| 4,734,704 | 3/1988 | Mizutani et al. | 347/212 |
| 5,216,438 | 6/1993 | Nakao et al. | 347/175 |
| 5,537,140 | 7/1996 | Hayashi et al. | 347/175 |
| 5,629,729 | 5/1997 | Fujishiro | 347/175 |

FOREIGN PATENT DOCUMENTS

| | | | |
|---|---|---|---|
| 5-38823 | 2/1993 | Japan | B41J 2/32 |

*Primary Examiner*—Benjamin R. Fuller
*Assistant Examiner*—L. Anderson
*Attorney, Agent, or Firm*—Sughrue, Mion, Zinn, Macpeak & Seas, PLLC

[57] ABSTRACT

A color thermal printer has a thermal head (18) for printing a full-color image in frame-sequential fashion to a color thermosensitive recording sheet (12), which includes at least yellow, magenta and cyan thermosensitive coloring layers (26–28) for developing yellow, magenta and cyan colors. Two transport rollers (22) nip and transport the recording sheet (12) while a thermal head (18) records to the recording sheet (12). At least one first fixing lamp (30, 70, 76) generates ultraviolet rays associated with the yellow coloring layer (28). At least one second fixing lamp (31, 71, 77) generates ultraviolet rays associated with the magenta coloring layer (27). The recording sheet (12) is fixed in a fixing station by the first and second fixing lamps (30, 31; 70, 71; 76, 77), which are supported by a fixer support device (35, 72, 74) in fashion selectively settable in the fixing station. The two fixing lamps (30, 31; 70, 71; 76, 77) are arrangeable substantially equally near to the two transport rollers (22) when set in the fixing station.

19 Claims, 7 Drawing Sheets

COLOR THERMAL PRINTER COLOR THERMAL PRINTER HAVING MOVABLE FIXING LAMPS

BACKGROUND OF THE INVENTION

1. Field of the Invention

The present invention relates to a color thermal printer. More particularly, the present invention relates to a color thermal printer in which an image can be printed on a recording sheet with reduced margin portions around the image.

2. Description Related to the Prior Art

There is a known color thermal printer in which color thermosensitive recording material is used and a full-color image is printed thereon. The recording material includes a support, and cyan, magenta and yellow coloring layers formed on the support in the order listed. In operation of printing, a thermal head is pressed against the recording material. A yellow image, at first, is thermally recorded to the yellow coloring layer line after line, shortly before the yellow coloring layer is fixed photochemically. Then a magenta image is recorded to the magenta coloring layer, which is fixed immediately. Finally a cyan image is recorded to the cyan coloring layer, to obtain the full-color image.

The thermal recording and the optical fixation to recording layers are effected while the recording material is transported relative to the thermal head and optical fixing device. To move the recording material past the thermal head, there are plural types of printers: a platen drum type and a back-and-forth moving type. In the platen drum type, the recording material is mounted on the periphery of a platen drum having a sufficiently great diameter. A clamp member is disposed on the platen drum, and is adapted to clamp a front edge of a recording sheet, to position it on the periphery of the platen drum. A printer of the platen drum type must have a considerable size, as the platen drum must be large in accordance with the size of a recording sheet. Although the platen drum type is suitable for being constructed to print a postcard, it is difficult to reduce a size of the platen drum type capable of using recording sheets of a B5 or A4 size. There is still an advantage in the platen drum type in that only a small area along the front edge is needed for positioning at the clamp member. Thus, an image can be recorded on the recording sheet only with small margin portions.

FIG. 10 schematically illustrates a color thermal printer of a type of back-and-forth movement. A transport roller set 2 is inclusive of a nip roller 2*a* and a lower driving roller 2*b*, nips a front edge of a color thermosensitive recording sheet 3, and transports the recording sheet 3 in forward and backward directions alternately: the forward direction from a supply tray 4 toward an exit path 5, and the backward direction from the exit path 5 to the supply tray 4. The recording sheet 3 is squeezed between a platen roller 7 having a small diameter and a thermal head 8, while yellow, magenta and cyan colors are recorded to it.

Downstream from the transport roller set 2 as viewed in the forward direction, there is disposed an optical fixing device 9, which includes a yellow fixing lamp 9*a* generating ultraviolet rays for yellow fixation, a magenta fixing lamp 9*b* generating ultraviolet rays for magenta fixation, and a lamp housing 9*c* for covering the fixing lamps 9*a* and 9*b*. While the recording sheet 3 is transported in the forward direction, the color images are recorded to the coloring layers. Then the fixing device 9 is actuated while the recording sheet 3 is transported in the either of the forward and backward directions, to fix the coloring layers photochemically. In the back-and-forth moving type, it is unnecessary to use the above-described platen drum. The use of the platen roller 7 is advantageous in reducing the size of the printer, as the diameter of the platen roller 7 is irrespective of the size of the recording sheet 3.

In the back-and-forth moving type of thermal printer, simply constructed mechanisms for transporting the recording sheet 3 require the recording sheet 3 to be squeezed in the transport roller set 2 incessantly. L1 in FIG. 10 designates a minimum squeezed range of the recording sheet 3 in the transport roller set 2. A rear edge of the recording sheet 3 in the range L1 cannot be positioned at the fixing device, and is obliged to be an imageless margin.

The back-and-forth moving type requires the fixing lamps 9*a* and 9*b* arranged laterally as illustrated in FIG. 10. The magenta fixing lamp 9*b* is farther from the transport roller set 2, so that there occurs a greater area along the rear edge that remains unfixed with the magenta fixing lamp 9*b* as compared with the yellow fixing lamp 9*a*. In the image area to be fixed in the recording sheet 3, its downstream portion is released sooner from being nipped at the transport roller set 2 and becomes free in the fixing station having a range L4. Accordingly remarkably greater irregularity in fixation of the magenta fixing lamp 9*b* occurs in the downstream portion of the image area.

The front edge of the recording sheet 3 in the range L2 is likely to have irregularity in fixation, and would have low image quality if an image is recorded there. It is necessary in the conventional back-and-forth moving type of printer to keep out of use a range L3 inclusive of L1 along the rear edge and L2 along the front edge in printing an image. There is a problem in that L3 is so great that an available area in the recording sheet 3 is limited considerably. It would be possible that plural lamps would constitute each fixing device for the purpose of shortening duration for fixation with an enlarged amount of fixing rays and heightened speed of transportation. However there occurs a problem in that the range L4 of applying rays would be greater. Available area in the recording sheet 3 would be even smaller.

SUMMARY OF THE INVENTION

In view of the foregoing problems, an object of the present invention is to provide a color thermal printer in which an image can be printed on a recording sheet with reduced margin portions around the image.

Another object of the present invention is to provide a color thermal printer in which durations for fixing coloring layers can be shortened effectively to raise efficiency in printing.

Still another object of the present invention is to provide a color thermal printer in which fixing lamps can be renewed with great ease.

In order to achieve the above and other objects and advantages of this invention, a color thermal printer has a transport roller set including two rollers for effecting forward and backward movements alternately, the forward movement transporting the recording material in a first direction, the backward movement transporting the recording material in a second direction. A thermal head heats the recording material during the forward movement to record to a selected one of the first to third coloring layers. A first fixing device applies electromagnetic rays in a first wavelength range to the recording material after recording to the first coloring layer to fix the first coloring layer. A second fixing device applies electromagnetic rays in a second wavelength range to the recording material after recording to the second coloring layer to fix the second coloring layer. A fixer support device supports the first and second fixing devices. A shifting device is connected to the fixer support device, for shifts the fixer support device, to set a selected one of the first and second fixing devices in a fixing station, the recording material transported past the fixing station to receive application of the electromagnetic rays from the selected one of the first and second fixing devices.

In the present invention, an image can be printed on a recording sheet with reduced margin portions around the image. Durations for fixing coloring layers can be shortened effectively to raise efficiency in printing. Fixing lamps can be renewed with great ease.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
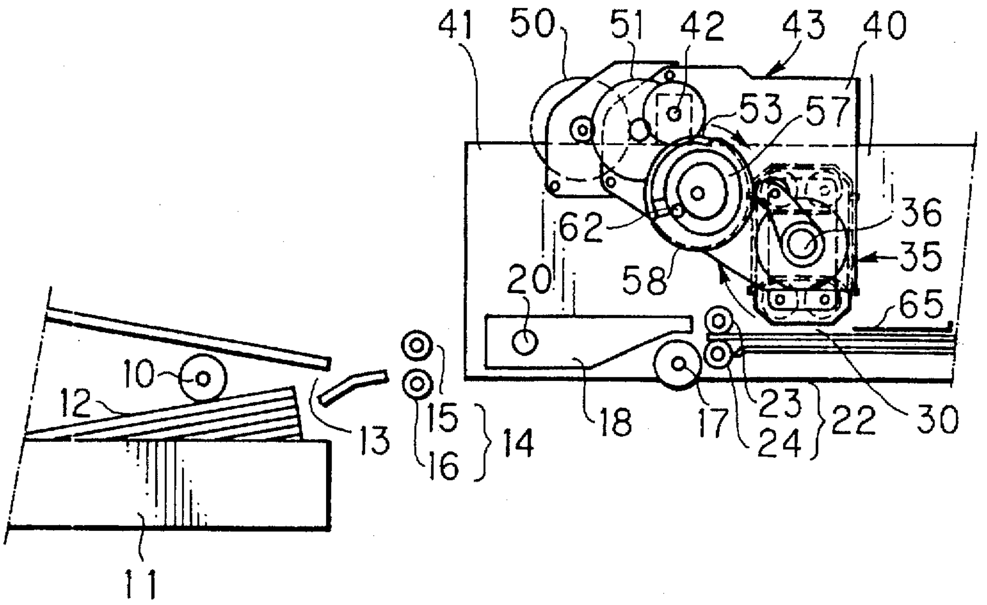
FIG. 1 is an explanatory view in elevation, illustrating a color thermal printer of the present invention.

FIG. 1 illustrates important sections of a color thermal printer. A feeding roller 10 feeds a color thermosensitive recording sheet 12 from a supply tray 11. The recording sheet 12 is transported through a feeding path 13 toward a first set of transport rollers 14. The transport roller set 14 includes an upper nip roller 15 and a lower driving roller 16, which squeeze the recording sheet 12 and move it to a gap between a platen roller 17 and a thermal head 18.

The thermal head 18 includes, as is known in the art, a great number of heating elements 18a, which are arranged in a line, and generate heat energy in accordance with a color and density at a pixel to be recorded. The thermal head 18 is mounted in swingable fashion about a shaft 20, and is swung clockwise to squeeze the recording sheet 12 between it and the platen roller 17.

The recording sheet 12 is passed between the thermal head 18 and the platen roller 17, and transported to a second set of transport rollers 22, which include an upper nip roller 23 and a lower driving roller 24, and squeeze the recording sheet 12. At the same time as the nip roller 23 moves, the thermal head 18 rotates clockwise about the shaft 20, presses the recording sheet 12 between it and the platen roller 17, and applies heat through the heating elements 18a to the recording sheet 12 at heat energy determined for recording a yellow image.

Figure 2:
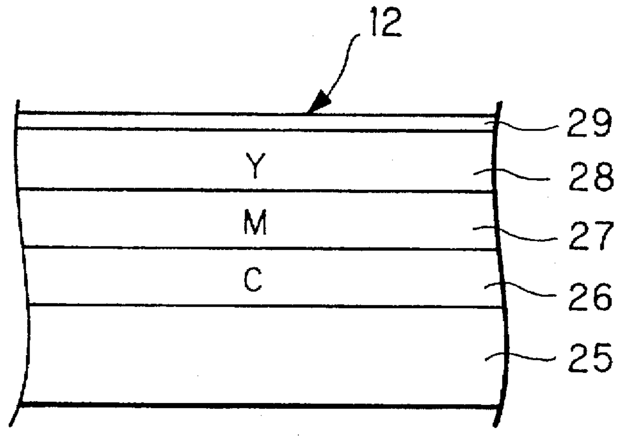
FIG. 2 is an explanatory view in section, illustrating a layered structure of a color thermosensitive recording sheet used in the thermal printer of FIG. 1.

In FIG. 2 illustrating a layered structure of the recording sheet 12, there are a cyan coloring layer 26, a magenta coloring layer 27, a yellow coloring layer 28, and a protective layer 29, which are formed on a support 25 in the order listed. The order of the recording to the coloring layers 26–28 is "yellow-magenta-cyan" from the obverse toward the reverse, namely from the protective layer 29 toward the support 25. If an alternative recording sheet for use with the printer has a structure as if the yellow coloring layer 28 and the magenta coloring layer 27 were interchanged, then its recording order is "magenta-yellow-cyan". The support 25 is opaque coated paper or plastic film. When the thermal printer is used for producing a sheet for an overhead projector (OHP), the support 25 can be transparent plastic film.

The cyan coloring layer 26 contains an electron donating dye precursor and an electron accepting compound as main components, and is colored in cyan when it is heated. The magenta coloring layer 27 contains a diazonium salt compound having a maximum absorbing factor at a wavelength of approximately 365 nm, and a coupler which thermally acts upon the diazonium salt compound and is colored in magenta. When the magenta coloring layer 27 receives application of ultraviolet rays of nearly 365 nm after thermal recording, the diazonium salt compound of the magenta coloring layer 27 is photochemically decomposed and loses its color developability. The yellow coloring layer 28 contains a diazonium salt compound having a maximum absorbing factor at a wavelength of approximately 420 nm, and a coupler which thermally acts upon the diazonium salt compound and is colored in yellow. When the yellow coloring layer 28 receives application of ultraviolet rays of nearly 420 nm after thermal recording, the diazonium salt compound of the yellow coloring layer 28 is photochemically fixed and loses its color developability.

Figure 3:
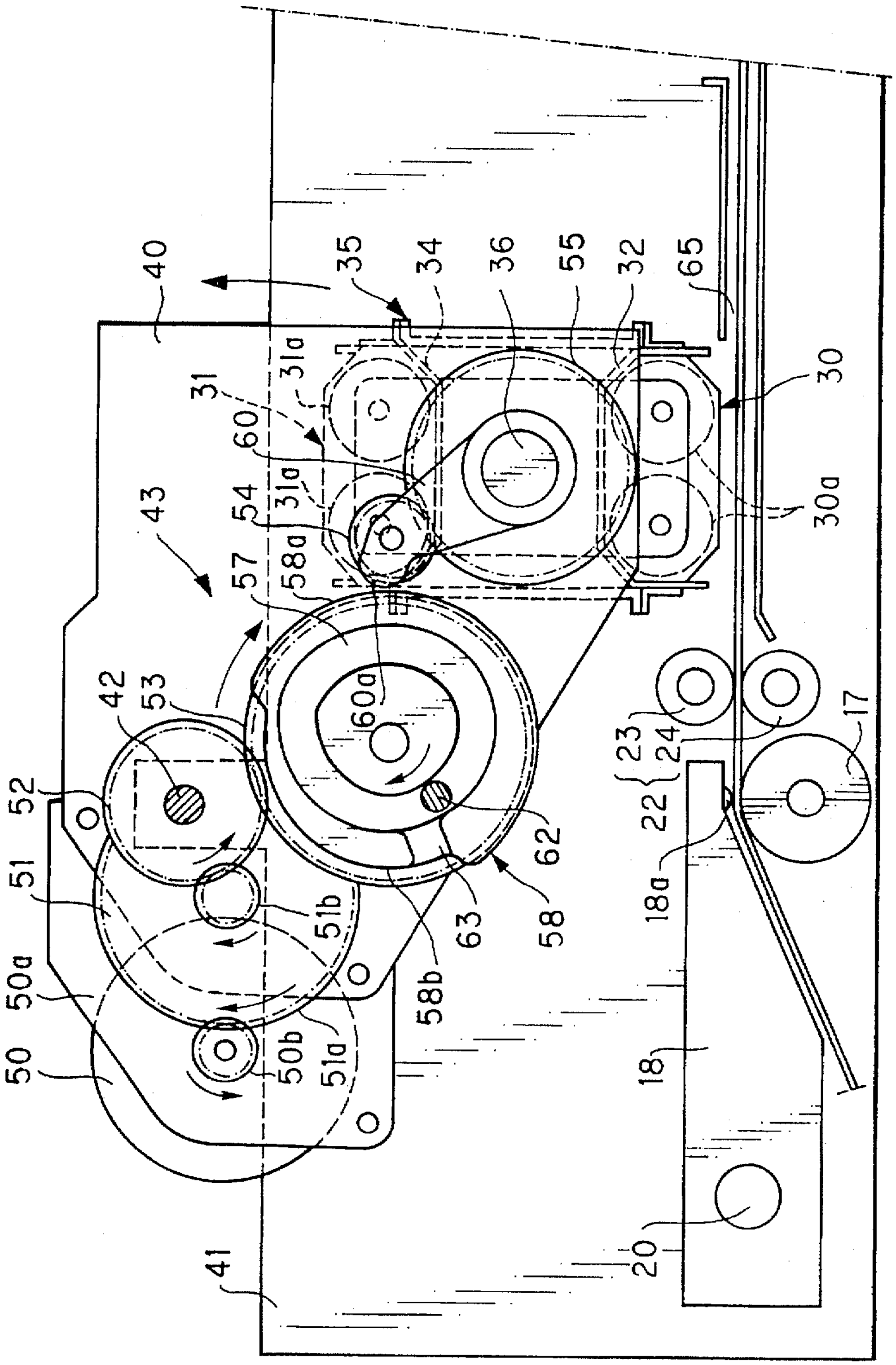
FIG. 3 is a side elevation illustrating a state where an optical fixing device in the thermal printer is moved down to a station for fixation.

As illustrated in FIG. 3, there are disposed first and second optical fixing device 30 and 31 closely to the nip roller 23 and downstream from the transport roller set 22 (to the right of the transport roller set 22 in the drawing). The yellow fixing device 30 for the yellow fixation includes two yellow fixing lamps 30a and a lamp housing 32. The lamp housing 32 reflects ultraviolet rays emanated from the yellow fixing lamps 30a and applies the rays to the recording sheet 12. The magenta fixing device 31 for the magenta fixation includes two magenta fixing lamps 31a and a lamp housing 34. The yellow fixing lamps 30a generate ultraviolet rays peaking at the wavelength of approximately 420 nm to fix the yellow coloring layer 28. The magenta fixing lamps 31a generate ultraviolet rays peaking at the wavelength of approximately 365 nm to fix the magenta coloring layer 27.

The fixing devices 30 and 31 are disposed on a fixer support device 35, and are rotationally symmetrical with each other about a shaft 36. Each time the fixer support device 35 makes half a rotation, the fixing devices 30 and 31 are changed over to one another to be set in a fixing station. The fixer support device 35 is mounted on a frame device 40 in rotatable fashion about the shaft 36. The frame device 40 is mounted on a printer body 41 in rotatable fashion about a shaft 42. The frame device 40 and the fixer support device 35 are linked together via a linking device 43. A device for positioning the fixing devices is constituted by the frame device 40, the fixer support device 35 and the linking device 43.

Figure 4:
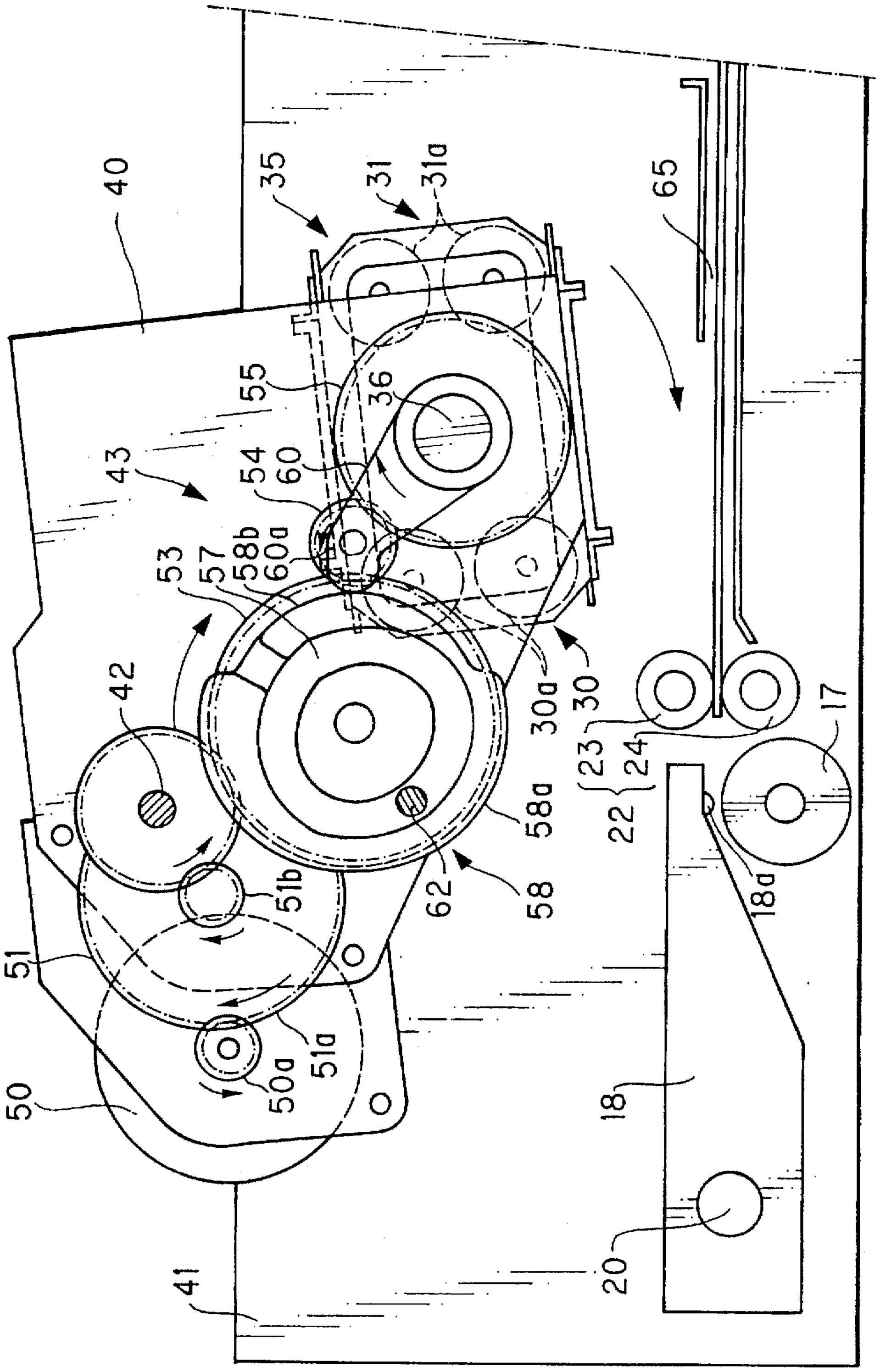
FIG. 4 is a side elevation illustrating a state where the optical fixing devices are being changed over.

The linking device 43, as illustrated in FIGS. 3 and 4, includes a motor 50, a speed reducing double gear 51, an intermediate gear 52, a first gear 53, a second gear 55, and a third gear 54. The motor 50 is mounted on a motor frame **50*a* secured to the frame device 40. The intermediate gear 52 is supported on the shaft 42 in rotatable fashion. The intermediate gear 52 is engaged with a smaller gear portion 51*b* of the double gear 51. A drive gear 50*b* of the motor 50 is in mesh with a greater gear portion 51*a* of the double gear 51, so that rotation of the motor 50 is reduced in speed to be transmitted to the intermediate gear 52**.

The first gear 53 is engaged with the intermediate gear 52. There is formed a clutch cam face 58 on a side of the first gear 53. There is formed a swing cam face 57 as a recess in a wall having the clutch cam face 58. The clutch cam face 58 is adapted to control of the engagement with the third gear 54, and consists of a projected portion **58*a* covering 9/10 of a circumference of the clutch cam face 58, and a recessed portion 58*b* beside the projected portion 58*a*. The third gear 54 is rotatably supported on a clutch arm 60, of which a distal end 60*a* as cam follower is contacted on the clutch cam face 58. The clutch arm 60 is secured on the shaft 36 of the fixer support device 35** in rotatable fashion.

The third gear 54 is engaged with the second gear 55 by the virtue of the clutch arm 60 in unremovable fashion. The clutch arm 60 is biased by a coil spring, to keep the cam follower end **60*a* of the clutch arm 60 in contact with the periphery of the clutch cam face 58. When the clutch arm 60 is contacted on the projected portion 58*a*, the third gear 54 is away from the first gear 53, and is disengaged from it. When the clutch arm 60 is contacted on the recessed portion 58*b*, the third gear 54 is engaged with the first gear 53, so that rotation of the first gear 53 is transmitted to the second gear 55 by the third gear 54. The recessed portion 58*b* is shaped to receive the cam follower end 60*a*, and allows the first gear 53 to come in engagement with the third gear 54. When the clutch cam face 58 comes to a rotational position for the recessed portion 58*b* to receive the cam follower end 60*a*, the fixer support device 35** starts half a rotation.

The gear proportion of the first gear 53 to the second gear 55 is such that the first gear 53 makes 1/10 of a rotation at the same time as the second gear 55 makes half a rotation. The fixer support device 35 is caused to make half a rotation via the second gear 55, to set the yellow fixing device 30 in the fixing station instead of the magenta fixing device 31. When the first gear 53 rotates to direct the projected portion **58*a* of the clutch cam face 58 to the clutch arm 60 instead of the recessed portion 58*b*, the clutch arm 60 is swung to disengage the first gear 53 from the third gear 54, to stop rotation of the second gear 55. When the first gear 53 makes one rotation, the frame device 40 comes down to the fixing station. The fixing devices 30 and 31 have finished being turned over. Note that the fixer support device 35 and the frame device 40 have a clicking mechanism (not shown), which operates for stopping the fixer support device 35 from further rotation than is enough exactly for the half rotation. When half a rotation is started, torque is applied to the fixer support device 35 through the third gear 54 to an extent sufficient for releasing the fixer support device 35 from being retained clickingly on the frame device 40**.

A cam follower 62, secured on the printer body 41, is engaged with the swing cam face 57 in the first gear 53. The cam follower 62 is stationary on the printer body 41 while the swing cam face 57 is swingable with the frame device 40. When the swing cam face 57 rotates in contact with the cam follower 62, the frame device 40 with the swing cam face 57 is swung in fashion relative to the cam follower 62, and between an advanced position of FIG. 3 and a retracted position of FIG. 4. Note that there is a removing groove 63 formed to communicate with the swing cam face 57, and adapted to removal of the cam follower 62 from the swing cam face 57. When the frame device 40 is lifted with the cam follower 62 positioned at the removing groove 63, the frame device 40 can be swung up beyond the range where the cam follower 62 is relatively movable along the swing cam face 57. The removing groove 63 is used to remove the cam follower 62 from the swing cam face 57, for the purpose of renewal of the fixing lamps **30*a* and 31*a* while the frame device 40** is lifted.

Operation of the above embodiment is described now. When a start switch is manually operated, an uppermost one of the recording sheets 12 in the sheet supply tray 11 is supplied by the feeding roller 10, passed through the sheet supply path 13, and transported to the transport roller set 14. A front edge of the recording sheet 12 comes between the nip roller 15 and the drive roller 16 of the transport roller set 14, which responsively squeeze the recording sheet 12 and transports it to the thermal head 18.

The recording sheet 12 passed between the thermal head 18 and the platen roller 17 is transported to the transport roller set 22, where the nip roller 23 and the drive roller 24 squeeze the recording sheet 12. The thermal head 18 rotates about the shaft 20 clockwise, to press the heating elements **18*a* against the recording sheet 12 on the platen roller 17. Then the transport roller set 14 is released from squeezing the recording sheet 12**.

The recording sheet 12 is transported in a forward direction by the transport roller sets 14 and 22, until a front edge of a recording area of the recording sheet 12 comes to the heating elements **18*a*. The heating elements 18*a* are driven to generate heat energy at values determined for pixels, to record a yellow image line after line thermally to the yellow coloring layer 28. To record one pixel, the heating elements 18*a* supply the recording sheet 12 with bias heat energy and image heat energy: the bias heat energy determined slightly short of coloring of the yellow coloring layer 28, and the image heat energy determined at an amount changed according to the coloring density of the image. In synchronism with the yellow recording, the yellow fixing lamps 30*a* are turned on. The yellow fixing lamps 30*a* apply near ultraviolet rays of approximately 420 nm to the recording sheet 12, to fix the yellow coloring layer 28 for avoidance of yellow coloring in the recording to the magenta coloring layer 27**.

The yellow image is recorded toward a rear edge of the recording area of the recording sheet 12, as viewed in the forward direction of its movement. Then the thermal head 18 is rotated counterclockwise about the shaft 20, and released from being pressed on the recording sheet 12. The transport roller set 22 is stopped temporarily. The transport roller set 22 is responsively started rotating in a reverse direction, to transport the recording sheet 12 backward. It is noted that the fixer support device 35 is disposed to position the fixing devices 30 and 31 highly close to the nip roller 23 of the transport roller set 22. This is advantageous, because unfixable portions and/or irregularly fixed portions on the recording sheet 12 are decreased. It is possible for a finished print to have smaller margin portions around an image.

While the recording sheet 12 is moved in the backward direction, the fixing devices 30 and 31 are turned over. As illustrated in FIG. 3, the motor 50 is rotated in the counterclockwise direction. The rotation is transmitted to the first gear 53 by the intermediate gear 52, to rotate the first gear 53 clockwise. Upon the start of the rotation, the cam follower 62 is pressed by the swing cam face 57, to start swinging the frame device 40, from the advanced position of FIG. 3 to the retracted position of FIG. 4. With the frame device 40 set in the retracted position, a distal end of the clutch arm 60 is detached from the projected portion 58*a* of the clutch cam face 58, and contacted on the recessed portion 58*b*. The first gear 53 comes in mesh with the third gear 54, to rotate the second gear 55 in the clockwise direction. The fixer support device 35 is caused to make half a rotation, to set the magenta fixing device 31 in the fixing station instead of the yellow fixing device 30. The rotation of the first gear 53 directs the projected portion 58*a* of the clutch cam face 58 to the clutch arm 60 instead of the recessed portion 58*b*. The clutch arm 60 is swung to disengage the first gear 53 from the third gear 54, to stop the second gear 55. The first gear 53 makes one rotation. The frame device 40 comes down to the fixing station. The fixing devices 30 and 31 have finished being turned over.

The recording sheet 12 is transported in the forward direction, until the front edge of the recording area of the recording sheet 12 comes to the heating elements 18*a*. The transport roller set 22 is stopped. The thermal head 18 is swung down to stand by. The transport roller set 22 rotates in the forward direction, to transport the recording sheet 12 in the forward direction. The heating elements 18*a* are driven to generate heat energy determined for a magenta image, to record the magenta image thermally to the magenta coloring layer 27. In synchronism with the magenta recording, the magenta fixing lamps 31*a* are turned on. The magenta fixing lamps 31*a* apply near ultraviolet rays of approximately 365 nm to the recording sheet 12, to fix the magenta coloring layer 27 for avoidance of magenta coloring in the recording to the cyan coloring layer 26.

The magenta image is recorded toward the rear edge of the recording area of the recording sheet 12, as viewed in the forward direction of its movement. Then the thermal head 18 is rotated counterclockwise about the shaft 20, and released from being pressed on the recording sheet 12. The transport roller set 22 is stopped temporarily. Similarly to the yellow recording, the transport roller sets 14 and 22 are responsively started rotating in the reverse direction.

The recording sheet 12 is transported, until the front edge of the recording area of the recording sheet 12 comes to the heating elements 18*a*. The thermal head 18 is swung down to stand by. The transport roller sets 14 and 22 rotate, to transport the recording sheet 12 in the forward direction. The heating elements 18*a* record the cyan image thermally to the cyan coloring layer 26. In synchronism with the cyan recording, the magenta fixing lamps 31*a* are turned on again. The magenta fixing lamps 31*a* apply the near ultraviolet rays to the recording sheet 12 for the purpose of bleaching it, till the end of the recording to the cyan coloring layer 26.

The three color images have been recorded to the coloring layers. The transport roller set 22, which is rotating, further rotates to send the recording sheet 12 to an exit path 65. The recording sheet 12 in the exit path 65 is moved by an exit roller and exited to a receptacle tray. The linking device 43 is swung again. The yellow fixing lamps 30*a* are set in the fixing station instead of the magenta fixing lamps 31*a*.

The fixing lamps 30*a* and 31*a* are renewed, when degraded or involved in breakdowns in operation. There is a keyboard (not shown) for inputting various commands to the printer. For the renewal of the fixing lamps 30*a* and 31*a*, the keyboard is manually operated to set a lamp renewing mode. At first in the lamp renewing mode, the motor 50 in FIG. 3 is rotated at such a predetermined amount as to position the removing groove 63 of the first gear 53 rotationally at the cam follower 62. Then the frame device 40 is lifted to disengage the cam follower 62 from the swing cam face 57. The frame device 40 is further lifted to move the fixing lamps 30*a* and/or 31*a* to a more largely open space, where the fixing lamps 30*a* and 31*a* can be removed with great easiness.

Figure 5:
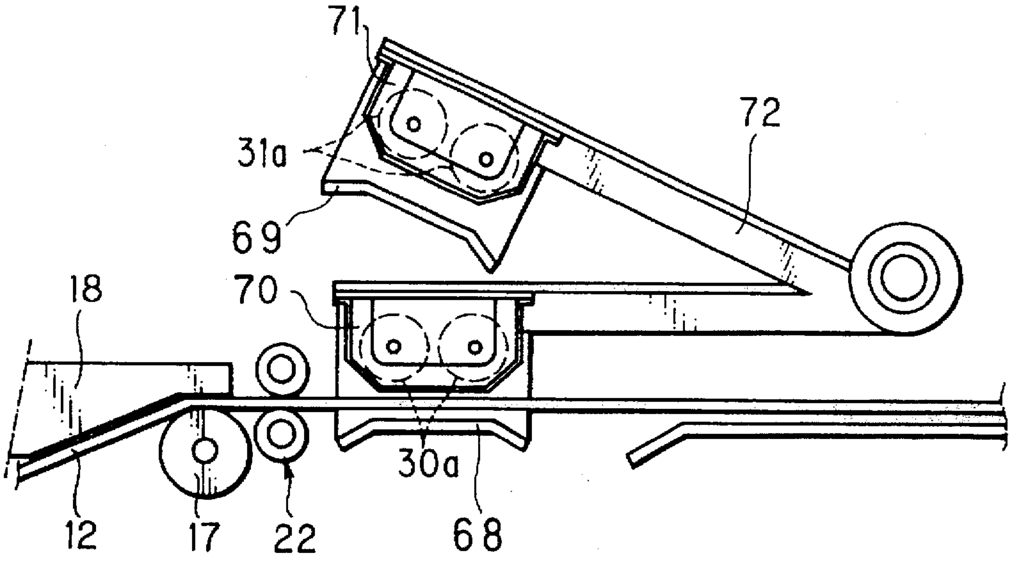
FIG. 5 is a side elevation illustrating a state where a swingable yellow fixing device of another preferred printer fixes the yellow coloring layer.
Figure 6:
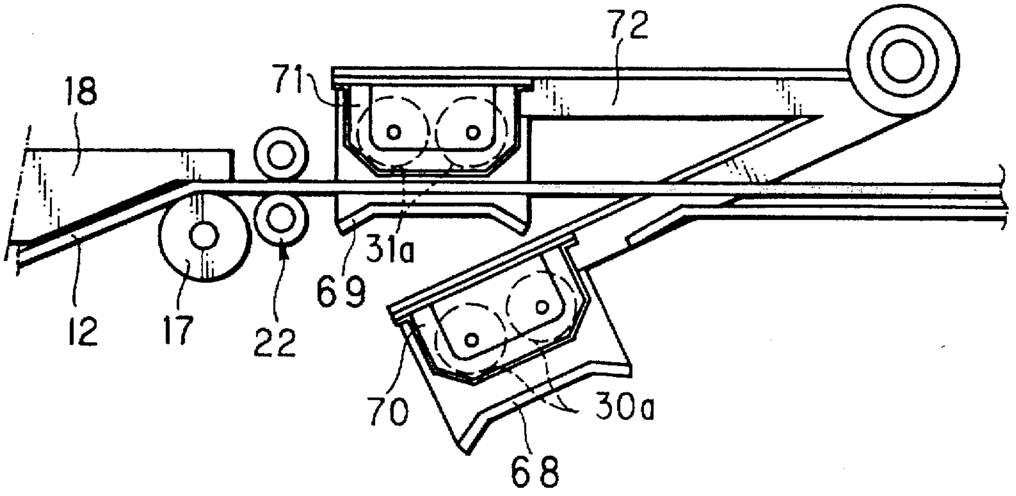
FIG. 6 is a side elevation illustrating a state where a magenta fixing device of the printer of FIG. 5 fixes the magenta coloring layer.

FIGS. 5 and 6 illustrate a preferred embodiment in which fixing devices 70 and 71 are easily changed over. The fixing devices 70 and 71 are mounted on a V-shaped fixer support device 72. When the fixer support device 72 is swung at a predetermined angle, the fixing devices 70 and 71 are selectively set in the fixing station. A guide plate 68 is mounted on an arm end at a predetermined interval from the fixing device 70 and supports the recording sheet 12 while fixed by the fixing device 70. Another guide plate 69 is associated with the fixing device 71.

Figure 7:
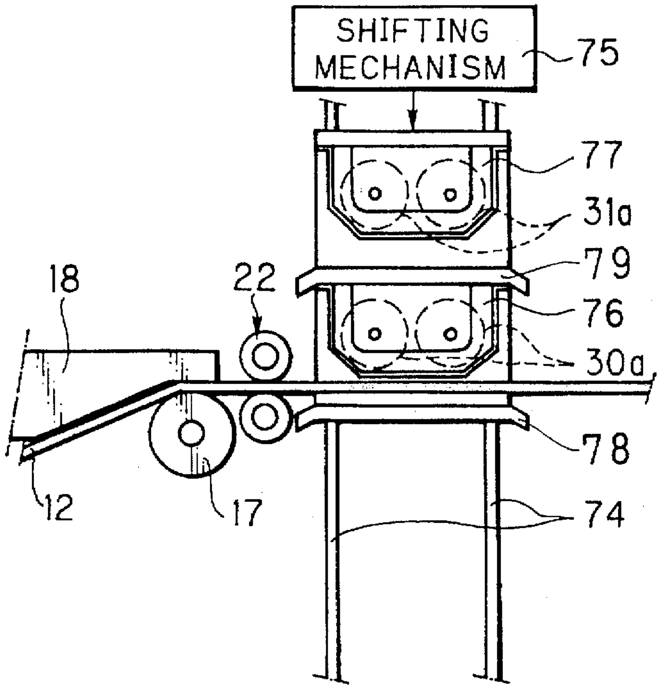
FIG. 7 is a side elevation illustrating a state where a slidable yellow fixing device of another preferred printer fixes the yellow coloring layer.
Figure 8:
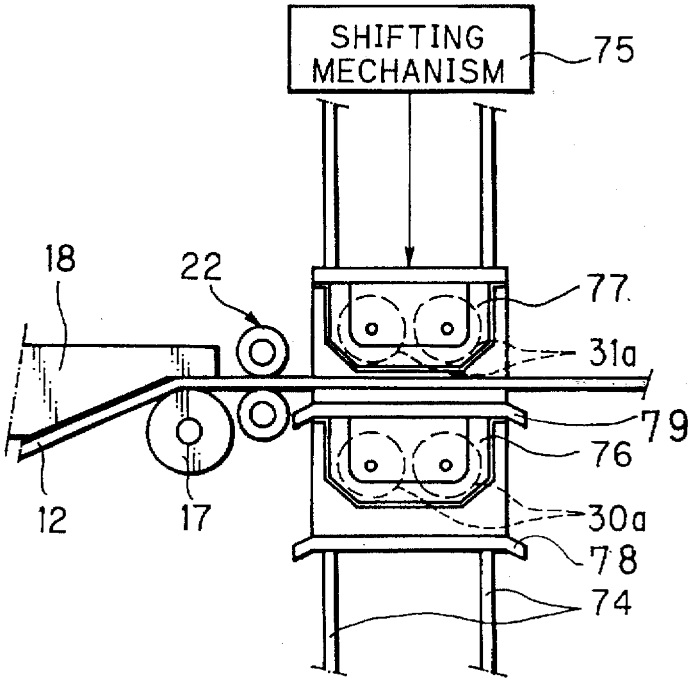
FIG. 8 is a side elevation illustrating a state where a magenta fixing device of the printer of FIG. 7 fixes the magenta coloring layer.

FIGS. 7 and 8 illustrate another embodiment, in which fixing devices 76 and 77 are supported on guide bars 74 and shifted by a shifting mechanism 75. The fixing devices 76 and 77 are raised and lowered by the shifting mechanism 75, and selectively set in the fixing station. A guide plate 78 is disposed at a predetermined interval from the fixing device 76 and supports the recording sheet 12 while fixed by the fixing device 76. Another guide plate 79 is associated with the fixing device 77.

Note that each of the fixing devices 30, 31, 70, 71, 76 and 77 has the two fixing lamps 30*a* or 31*a* in the above embodiments, but can have one, or three or more fixing lamps. In the above embodiment, the clutch mechanism as transmission mechanism is constituted of a clutch cam constructed in simply mechanical fashion. However it is alternatively possible to use an electromagnetic clutch for causing the fixer support device to make half a rotation when the frame device has the retracted position. It is also possible to use an intermittently toothed mechanism operated to transmit rotation in intermittent fashion.

Figure 9:
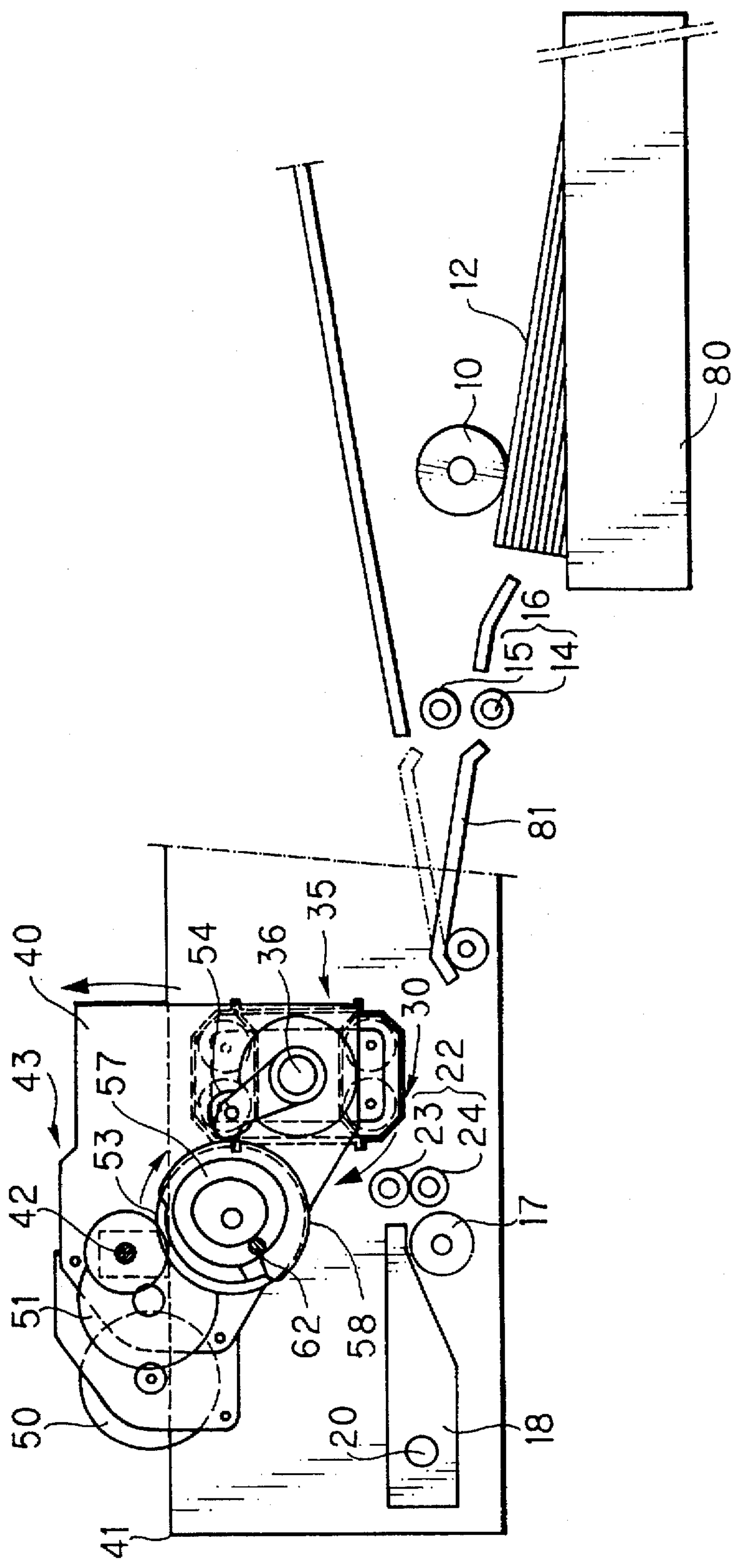
FIG. 9 is an explanatory view in elevation, illustrating another preferred printer of which a sheet supply tray is disposed differently with reference to the thermal head and the fixing devices.
Figure 10:
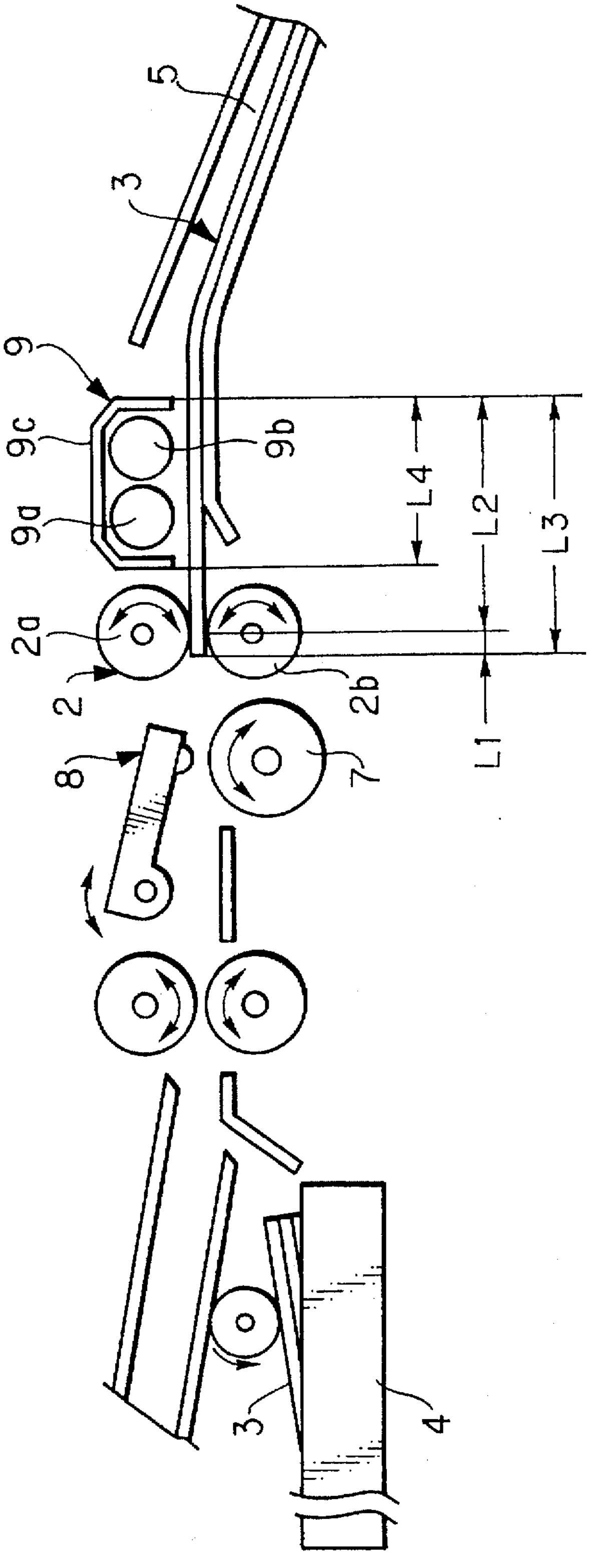
F I G. 10 (PRIOR ART)
FIG. 10 is an explanatory view illustrating a conventional color thermal printer.

In the above embodiment, the thermal head 18 lies between the fixing station and the supply tray 11 as illustrated in FIG. 1. Alternatively the thermal head 18 can lie between a fixing station and a supply tray 80, as illustrated in FIG. 9. Elements similar to those of the above embodiment are designated with identical reference numerals. Reference numeral 81 designates a swingable guide plate, which is swung down in a supply position, where the recording sheet 12 is supplied from the sheet supply tray 80 to the thermal head 18. The swingable plate 81 is swung up in an exit position, where the recording sheet 12 is directed from the thermal head 18 toward the receptacle tray. At first in operation, the swingable plate 81 is set in the supply position. The recording sheet 12 is fed from the sheet supply tray 80. As soon as a rear edge of the recording sheet 12 comes to the thermal head 18, the mechanism for the transportation is all stopped. The swingable plate 81 is set in the exit position. The recording sheet 12 is transported in the forward direction, to record and fix a yellow image to the yellow coloring layer 28. After the yellow fixation, the recording sheet 12 is transported in the backward direction, to set it in the printing start position again. A magenta image is recorded and fixed to the magenta coloring layer 27. Then a cyan image is recorded to the cyan coloring layer 26. It is to be noted that a stationary guide plate may be used instead of the swingable plate 81. It is preferable for the stationary guide plate to have an angle of intersection to an exit path, in such a manner that, after an edge of the recording sheet 12 comes toward the exit path from the stationary guide plate, the recording sheet 12 can be inevitably guided toward the receptacle tray, while prevented from being directed to the supply tray.

In the above embodiments, the thermal recording and the fixation are effected in course of transporting the recording sheet 12 equally in the forward direction. Alternatively, the fixation may be effected during transportation in the backward direction, otherwise in both forward and backward directions.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A color thermal printer for printing a full-color image in frame-sequential fashion on a color thermosensitive recording material including at least first to third thermosensitive coloring layers for developing respective different colors, said color thermal printing have transport means for effecting forward and backward movement alternately, said forward movement transporting said recording material in a first direction, said backward movement transporting said recording material in a second direction, a thermal head within a path of movement of said recording material for heating said recording material during said forward movement to record to a selected one of said first to third coloring layers, a first fixing device including a first lamp for applying electromagnetic rays in a first wavelength range to said recording material after recording to said first coloring layer to fix said first coloring layer, and a second fixing device including a second lamp for applying electromagnetic rays in a second wavelength range to said recording material after recording to said second coloring layer to fix said second coloring layer, said first and second fixing devices being forward of said thermal head, said color thermal printer comprising:

- a fixer support device for supporting said first and second fixing devices; and
- a shifting device, connected to said fixer support device, for shifting said fixer support device, to position one of said first and second fixing devices in a fixing station, said recording material transported past said fixing station by said transport means to receive application of said electromagnetic rays from said one of said first and second fixing devices.

2. A color thermal printer as defined in claim 1, wherein said thermal head, said transport roller set and then said fixer support device are arranged in said first direction.

3. A color thermal printer as defined in claim 1, wherein said first fixing device includes at least one first ultraviolet lamp, and said second fixing device includes at least one second ultraviolet lamp.

4. A color thermal printer as defined in claim 3, wherein said fixer support device is slidable in a slidable direction which is crosswise to said first direction in which said recording material is transported through said fixing station, said first and second fixing devices are arranged in said slidable direction of said fixer support device, said fixer support device further supports first and second guide plates arranged in said slidable direction, said first guide plate is disposed at a predetermined interval from said first fixing device and supports said recording material while fixed by said first fixing device, and said second guide plate is disposed at a predetermined interval from said second fixing device and supports said recording material while fixed by said second fixing device.

5. A color thermal printer as defined in claim 3, wherein said fixer support device is swingable, and includes first and second arms rotatable about a pivot axis, said first and second arms are disposed in a V-shape, a first guide plate is mounted on an end of said first arm at a predetermined interval from said first fixing device and supports said recording material while fixed by said first fixing device, and a second guide plate is mounted on an end of said second arm at a predetermined interval from said second fixing device and supports said recording material while fixed by said second fixing device.

6. A color thermal printer as defined in claim 3, wherein said fixer support device is rotatable, said first and second fixing devices are disposed in rotationally symmetrical fashion to each other with reference to a rotational axis of said fixer support device.

7. A color thermal printer as defined in claim 6, wherein said shifting device includes:

- a motor; and
- a transmission mechanism, displaceable between a connecting state where said fixer support device is connected to said motor, and a disconnecting state where said fixer support device is disconnected from said motor, for transmitting rotation of said motor intermittently to said fixer support device, wherein when said transmission mechanism is in said connecting state, said rotation of said motor causes said fixer support device to rotate, and when said transmission mechanism has said disconnecting state, said fixer support device is stopped.

8. A color thermal printer as defined in claim 6, further comprising:

- a frame device for supporting said fixer support device rotatably, said frame device disposed in fashion movable between an advanced position adapted to fixation in said fixing station and a retracted position adapted to allowing said fixer support device to rotate; and
- a linking device, connected to said frame device and said transmission mechanism, for moving said frame device and for controlling said transmission mechanism in linkage with moving of said frame device, wherein said linking device moves said frame device from said advanced position to said retracted position, brings said transmission mechanism into said connecting state for causing said fixer support device to make said half a rotation in said rotation of said motor, and then moves said frame device to said advanced position, one of said first and second fixing devices shifted away from said fixing station to set another of said first and second fixing devices in said fixing station.

9. A color thermal printer as defined in claim 8, wherein said frame device is swingable between said advanced position and said retracted position.

10. A color thermal printer as defined in claim 9, wherein said transmission mechanism includes:

a first gear rotated by said motor;

a clutch cam face, disposed in fashion rotatable with said first gear, said clutch cam face having a recessed portion having a rotational diameter smaller than said first gear, and a projected portion having a rotational diameter greater than said first gear;

a second gear, secured to said fixer support device and having a rotational axis common to said rotational axis of said fixer support device;

a third gear, disposed between said first and second gears; and a clutch arm, having first and second ends, said first end secured rotatably on said rotational axis of said second gear, said clutch arm supporting said third gear rotatably between said first and second ends, and keeping said second and third gears engaged with one another, said second end disposed in an orbit where said clutch cam face rotates; wherein, when said frame device is swung to said retracted position, said second end is received by said recessed portion of said clutch cam face to engage said third gear with said first gear; and when said frame device is swung to said advanced position, said second end is pressed by said projected portion of said clutch cam face to disengage said third gear from said first gear.

11. A color thermal printer as defined in claim 10, wherein said linking device further includes:

a cam follower disposed in stationary fashion; and a swing cam face, disposed on said first gear, and having a first and second part, said cam follower disposed in an orbit where said swing cam face rotates, said first part pressed against said cam follower to swing said frame device to said retracted position, and said second part confronted with said cam follower to allow swinging said frame device to said advanced position.

12. A color thermal printer as defined in claim 11, wherein said swing cam face is formed by recessing a wall of said first gear;

further comprising a removing groove, formed in said first gear to communicate said swing cam face to a periphery of said first gear, and adapted to removal of said cam follower from said swing cam face.

13. A color thermal printer as defined in claim 12, wherein said second fixing device is further actuated after recording to said third coloring layer for bleaching said third coloring layer.

14. A color thermal printer as defined in claim 13, wherein said first coloring layer is heated to develop a yellow color, said second coloring layer is heated to develop a magenta color, and said third coloring layer is heated to develop a cyan color.

15. A color thermal printing method, in which a color thermosensitive recording material is used and includes at least first to third thermosensitive coloring layers for developing respective different colors, a transport roller set including two rollers nips and transports said recording material while a thermal head records to said recording material, said recording material is subjected to fixation in a fixing station, thereby to print a full-color image in frame-sequential fashion, said color thermal printing method comprising steps of:

supporting at least one first, and at least one second fixing lamps in fashion selectively settable in said fixing station, said first fixing lamp generating first electromagnetic rays associated with said first coloring layer, and said second fixing lamp generating second electromagnetic rays associated with said second coloring layer, said first and second fixing lamps arranged adjacent said transport roller set when set in said fixing station;

setting said first fixing lamp in said fixing station;

recording to said first coloring layer through said thermal head while said recording material is transported in a first direction;

applying said first electromagnetic rays through said first fixing lamp to said recording material while transported in said first direction, to fix said first coloring layer;

transporting said recording material in a second direction reverse to said first direction;

removing said first fixing lamp from said fixing station;

setting said second fixing lamp in said fixing station;

recording to said second coloring layer through said thermal head while said recording material is transported in said first direction after fixation of said first coloring layer;

applying said second electromagnetic rays through said second fixing lamp to said recording material while transported in said first direction, to fix and said coloring layer;

transporting said recording material in said second direction; and recording to said third coloring layer through said thermal head while said recording material is transported in said first direction after fixation of said second coloring layer.

16. A color thermal printing method as defined in claim 15, further comprising steps of:

supporting said first and second fixing lamps at a fixer support device, said fixer support device shifted to set said first and second fixing lamps selectively in said fixing station;

supporting said fixer support device in fashion movable between an advanced position determined near to said fixing station and a retracted position determined away from said fixing station;

after said first fixing lamp is actuated, moving said fixer support device from said advanced position to said retracted position before said second fixing lamp is actuated;

shifting said fixer support device of said retracted position to change over said first and second fixing lamps; and moving said fixer support device to said advanced position, to set said second fixing lamp in said fixing station.

17. A color thermal printing method as defined in claim 16, further comprising the step of transporting said recording material in said second direction from a supply section to said thermal head before said recording and applying steps.

18. A color thermal printing method as defined in claim 16, further comprising the step of transporting said recording material in said first direction from a supply section to said thermal head prior to said recording and applying steps.

19. A color thermal printer, in which a color thermosensitive recording material is used and includes at least first to third thermosensitive coloring layers for developing respective different colors, transport means for transporting said recording material along a conveyance path past a thermal head which records to said first coloring layer, at least one first fixing lamp for applying first electromagnetic rays associated with said first coloring layer to said recording material to fix said first coloring layer, at least one second fixing lamp for applying second electromagnetic rays associated with said second coloring layer to said recording material to fix said second coloring layer, thereby to print a full-color image in frame-sequential fashion, said first and second fixing lamps being located downstream of said thermal head, said color thermal printer comprising:

a fixer support device, shiftable relative to a fixing station located along said conveyance path, for supporting said first and second fixing lamps, said recording material transported past and fixing station, and said fixing station adapted to fix said recording material; and a shifting device, connected to said fixer support device, for shifting said fixer support device, to alternatively set said first and second fixing lamps in said fixing stating, thereby to render said fixing station arrangeable closely to said transport roller set;

a moving device, connected to said fixer support device, for moving said fixer support device between an advanced position adapted to fixation in said fixing station and a retracted position adapted to allowing said shifting device to shift said fixer support device; and a linking device, connected to said shifting device and said moving device, for driving said shifting device and said moving device in synchronism; wherein said linking device, after said first fixing lamp is actuated, causes said moving device to move said fixer support device from said advanced position to said retracted position before said second fixing lamp is actuated; causes said shifting device to shift said fixer support device of said retracted position to change over said first and second fixing lamps; and causes said moving device to move said fixer support device to said advanced position, to set said second fixing lamp in said fixing station.

* * * * *